Nov. 3, 1953

A. DORNE ET AL 2,658,145

CAVITY ANTENNA

Filed Jan. 7, 1946

INVENTORS.
ARTHUR DORNE
DAVID LAZARUS

BY

*William D. Hall.*
ATTORNEY

Nov. 3, 1953    A. DORNE ET AL    2,658,145
CAVITY ANTENNA

Filed Jan. 7, 1946    2 Sheets-Sheet 2

INVENTORS.
ARTHUR DORNE
DAVID LAZARUS
BY
William D. Hall.
ATTORNEY

Patented Nov. 3, 1953

2,658,145

UNITED STATES PATENT OFFICE 2,658,145

CAVITY ANTENNA

Arthur Dorne and David Lazarus, Cambridge, Mass., assignors to the United States of America as represented by the Secretary of War Application January 7, 1946, Serial No. 639,653

18 Claims. (Cl. 250—33)

This invention relates generally to electrical apparatus. More particularly it relates to flush mounted radio antennas particularly suitable to aircraft installation.

In the installation of radio equipment on aircraft it is desirable to employ antennas which offer a minimum of wind resistance and contribute a minimum of drag; which are as compact as possible; which offer suitable directional characteristics; and which, for certain adaptations, are broad band, that is not excessively sensitive to frequency changes. There have been several methods used to meet these requirements. Antennas which have been mounted so as to extend outside of the skin of aircraft have been formed to have contours adapted to minimize wind resistance; their physical size has been kept small by the selection of high operating frequencies as well as by the use of designs resulting in certain "electrical dimensions" being greater than physical ones; and broad banding has been achieved by the use of radiating elements having relatively great thickness and by other design features well known to the art for producing frequency insensitivity. The conventional method for reducing wind resistance, which is described above, is reasonably satisfactory for aircraft which travel at low and moderate speeds. However, in very high speed aircraft, antennas which extend beyond the skin of the aircraft, even if they are streamlined, contribute substantial amounts of drag.

It is an object of this invention to provide a radio antenna which can be mounted flush with the skin of aircraft so as to present no appreciable protrusion from the exterior surface of the craft. It is another object to provide an antenna which will have small physical proportions thus requiring little space inside of the plane, and it is a further object to provide an antenna which will have satisfactory directional and broad band electrical characteristics.

Generally this invention comprises a cavity having a slot-like aperture somewhat resembling in appearance a short section of wave guide closed at one end which acts as a radiating source for radio frequency energy. This cavity is excited internally by a radiating element mounted within it and is excited in such a way that an electromagnetic field will extend out of its slotted or open end in a suitable radiation pattern. The open end or slot of said cavity may be adapted for flush mounting on the surface of aircraft, and said cavity should include design features and elements rendering it both compact and with a broad operating-frequency band width.

Other objects, features and advantages of this invention will suggest themselves to those skilled in the art and will become apparent from the following description of the invention taken in connection with the accompanying drawing in which:

Fig. 2, shows a T-shaped exciter.

Figure 1:
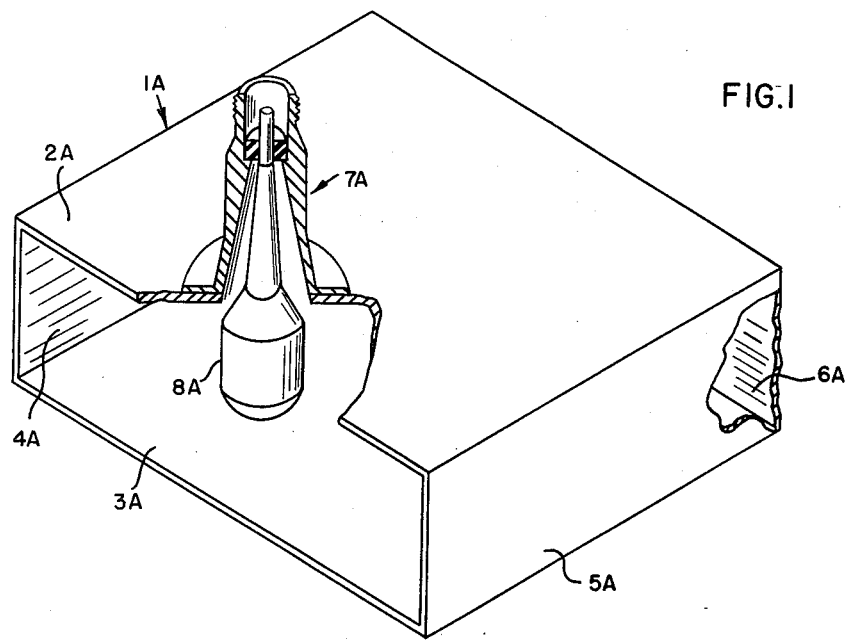
Fig. 1 is an isometric view of a simple embodiment of a "slot" antenna cut away to show the manner in which the exciting element is connected to the cavity portion and also to show the pressure of an end plate closing the side located opposite to the slot.

Referring now more particularly to Fig. 1, element $1a$ is a cavity having the same physical characteristics as a short section of metallic wave guide. It has opposite sides $2a$ and $3a$ across which a radio frequency electric field will exist in the intended mode of excitation. It has two other sides $4a$ and $5a$ which are also opposite to each other and which are joined to sides $2a$ and $3a$ to form a conductive tube having a substantially rectangular cross-section. This tube is open at one end, and it is closed at the opposite end by end plate $6a$ which may be an integral part of cavity $1a$. It is because of the appearance of the open end that the name, slot antenna, has been applied to this device. There is fastened to side $2a$ a connector $7a$ by which a lead-in cable coming from the radio frequency power source can be attached. This connector may be of conventional design and may include within it a coaxial or other matching transformer adapted to match the input impedance presented by the radiating element or exciting probe $8a$ to the output impedance of the lead-in line.

In part radiating element 8a radiates directly out of the open end of the cavity 1a. However, it also radiates energy in the opposite direction, i. e. toward end plate 6a. This energy, however, is reflected from end plate 6a, and, therefore, it, also, is emitted from the open slot. The distance between end plate 6a and radiating element 8a and the distance between the slot and element 8a both play a part in matching the antenna to the load presented by space. Radiating element 8a should be mounted back from the slot by a distance of less than one-eighth of a wavelength plus any integral number of half wavelengths. The wavelength used as the basis of this measurement is that which corresponds to the lowest intended operating frequency. The distance between element 8a and the side opposite to the slot, as measured in terms of the same wavelength, should be more than one-eighth and less than one-quarter of a wavelength plus any integral number of half wavelengths.

Figure 2:
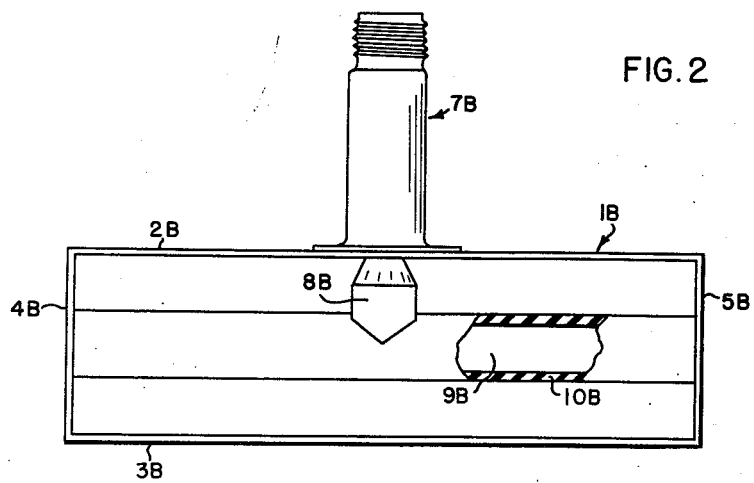
Fig. 2 is a view taken directly into the open end of another embodiment of the slot antenna showing the manner of installation of a matching device which is a physical extension of the exciting element and which gives it the general conformation of a letter T.

Referring now to Fig. 2, it will be seen that this embodiment of the slot antenna employs a radiating element 8b which is slightly different from the corresponding element 8a of Fig. 1. This slight difference in its shape results from the fact that element 8b is adapted to be attached to additional element 9b. Also associated with elements 8b and 9b is a dielectric sheath element 10b which is a covering surrounding element 9b. Element 10b may or may not be employed depending on the requirements of the particular installation. Element 9b has substantially the shape of a cylindrical bar of conductive material about equal to the diameter of radiating element 8b. It is physically attached to element 8b and serves to connect it at a point corresponding to what is the free end of element 8a in Fig. 1 to sides 4b and 5b of cavity element 1b. It has been found that, by using a conductive element such as 9b and by connecting it in this way, matching of the antenna to the radio frequency source can be achieved without reliance upon the use of a large dimension, in terms of one of the wavelengths described above, as measured between radiating element 8b and the end plate of the cavity 1b. Instead, matching is effected by the presence of element 9b as well as by the length dimension of cavity 1b. Element 10b makes it possible for element 9b to have the effective electrical length necessary for it to perform such a matching function without sole reliance on its physical length. The manner in which element 10b accomplishes this and the manner in which element 9b broadens the operating band width will be disclosed more fully hereinafter.

Figure 3:
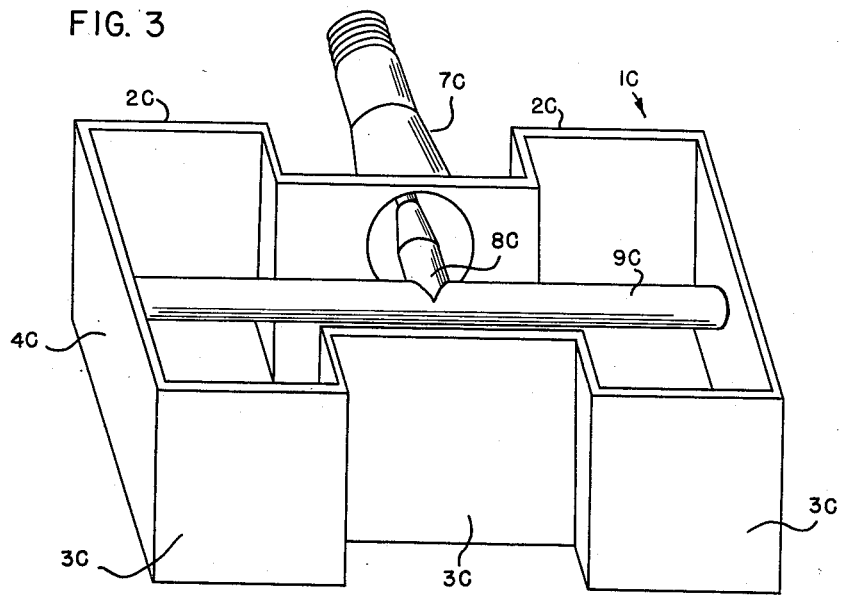
Fig. 3 is an isometric view of another embodiment of a slot antenna which is capacitance loaded by distortion of the shape of the cavity, and this figure, as does

Referring now to Fig. 3, it will be seen that sides 2c and 3c of cavity 1c are distorted in the region of their central portions so as to approximate one another more closely. This disturbs the sinusoidal symmetry of the electrical field strength distribution between sides 2c and 3c and, therefore, capacitively loads the slot antenna. It has been found that where capacitance loading is employed it is possible to reduce the other dimension of the cross-section of cavity 1c without reducing the cutoff frequency on the long wavelength side of the operating frequency band. Therefore, in this embodiment, the dimension measured between sides 4c and 5c can be smaller physically than the corresponding dimensions in an embodiment which does not employ capacitance loading. Because of the contemplated use in aircraft, this more compact construction without sacrifice of important electrical characteristics, in particular the ability to function at relatively long wavelengths without cutoff, is most desirable, and it meets one of the objects of the invention.

Figure 4:
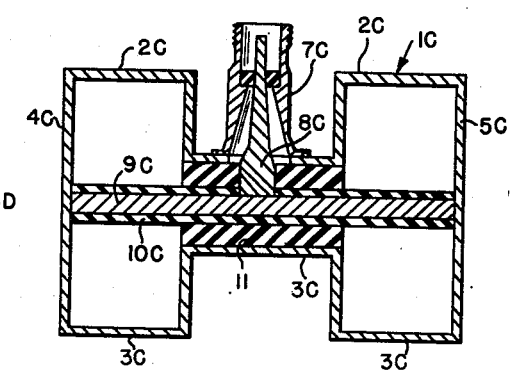
Fig. 4 is a sectional view of the embodiment shown in Fig. 3 with the addition of a dielectric block element which serves as an additional means of capacitance loading, the sectional view being taken in a plane passing through the center of the T exciter.

Referring now to Fig. 4, it will be seen that a dielectric block 11 occupies the space between sides 2c and 3c in the region where sides 2c and 3c are made to approximate each other. It can be readily understood by the application of fundamental principles that the presence of dielectric block 11 also capacitively loads the slot antenna. Because of this, the use of block 11 permits a further reduction in physical size, particularly a reduction of the dimension measured between sides 4c and 5c. All of the space inside of cavity 1c can be similarly filled with any suitable dielectric substance, such as polystyrene, and the overall effect is to permit even smaller physical dimensions. Several theories have been advanced as to why this is so. These explanations relate either to the concept of capacitance loading or to the well known concept of the effect on the electrical dimensions of cavities and guides which results from a reduction of the velocity of propagation. Whether these theories are correct or not, it has been found empirically that a physically smaller slot antenna is the result of this type of construction.

Figure 5:
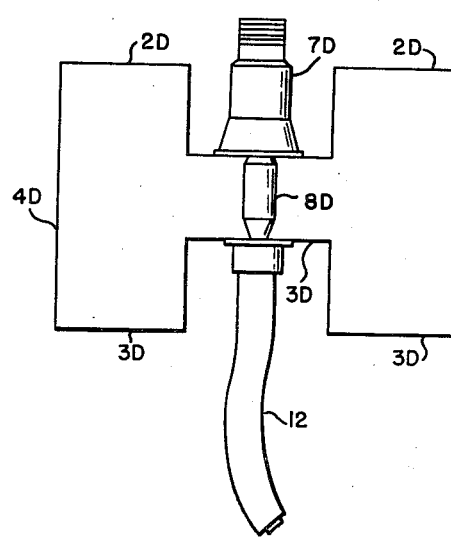
Fig. 5 is a view taken into the open end of an embodiment similar to that shown in Fig. 3 but which employs an alternate means of matching the exciter to the slot.

Referring now to Fig. 5, it will be seen that no matching element of the type used in the embodiments shown in Figs. 2, 3, and 4 is used. Instead, in this embodiment, that type is replaced by a transmission line matching stub of selected length connected to the end of radiating element 8d which corresponds to the free end of element 8a in Fig. 1. In the embodiment shown in Fig. 5 this stub consists of pigtail 12 of coaxial transmission line which is short circuited at one end and is connected at its other end to the end of radiating element 8d described above. The length of this pigtail can be selected so that it offers a lumped value of capacitance and balances out the inductive reactance presented by the end plate. The foregoing portion of this disclosure has described the physical construction and arrangement of several embodiments of this invention and has touched upon certain of the principles of operation. The portion which follows immediately hereafter is intended primarily to explain somewhat more fully the principles of operation.

The use of a matching element, of the type shown in Figs. 2, 3 and 4 as elements 9b and 9c, offers an advantage in one particular feature of its performance. It causes the antenna to remain efficient over a greatly increased frequency band. This is due to the fact that this type of matching element and the end plate of the cavity may both offer reactances which are in effect, in one concept of an equivalent circuit of this antenna, interposed in series with the load presented by the antenna and that in the suggested arrangement they tend to cancel each other out. If this matching element is not used and if instead the reactance offered by the end plate is adjusted to a value suitable for matching by appropriate selection of the distance between it and the radiating element, this selection would be correct only at or near a specific frequency. However, where the matching element is used not only does it offer compensation to the reactance offered by the end plate so that the distance described above can be a short one, with respect to one wavelength corresponding to the operating frequency, particularly on the long wavelength end of the operating range, but, in addition, this compensation is effective over a realtively wide frequency band. This is due to the fact that throughout this relatively wide frequency band the reactances offered by these elements have independent tendencies to change somewhat equally as frequency changes occur, and the changes, of course, are opposite. In general the reactance offered by the matching section is capacitive while that offered by the end plate of the cavity, particularly when the guide is very short in length, is inductive.

The manner in which this type of matching element presents capacitive reactance to the free end of the radiating element by being electrically connected between that free end and the sides of the cavity which have been described as 4a and 5a; 4b and 5b; 4c and 5c; and 4d and 5d can be explained as follows:

The matching element itself may be looked upon as the inner conductor of a coaxial line while the hollow space formed by the cavity element of the slot antenna may be regarded as the outer conductor. The axis of said coaxial line would, of course, be along the axis of the matching element. When so considered, it immediately becomes obvious, by the application of well known transmission line principles, that its electrical length determines the reactance reflected to the feed point. If the electrical length is between one-quarter and one-half wavelength, this reactance will be capacitive. Where the dimension requirements of the cavity require it, this section of line can be made electrically longer than its physical length by the expedient of filling up the space between the inner and outer conductors with a dielectric material. This effect is achieved through the use of a dielectric sheath of the type shown in Figs. 2 and 4 as elements 10b and 10c. The presence of a dielectric having a dielectric constant greater than 1 results in a reduction of the velocity of propagation along such a line, and, therefore, an electrical wavelength occurs in a physical distance less than a wavelength. It will be noted by reference to Fig. 2 that the dielectric sheath need not fill up all the space between the outside of the matching element and the inside of the cavity, but can be made of thin-walled material. Because of the fact that the lines of electric force about the matching element converge upon it and have their greatest intensity near to it, the dielectric sheath offers its greatest effectiveness near to the matching element and isn't essential in the remaining space. Of course, there is no reason why a sheath of greater thickness cannot be used if desired.

It has been found that in slot antennas the operating band width is reduced when sides corresponding to sides 2a and 3a of Fig. 1 are brought closer together. This is also true where those sides are distorted in the manner explained above with respect to the embodiment shown in Fig. 3. Conversely this type of antenna becomes more broad banded when said sides are placed further apart. Therefore, in the use of antennas of this type considerable latitude in giving preference to band width or compactness or vice versa, for satisfying specific requirements, is available.

Where narrowing of the band width results from capacitance loading, it may be found desirable to broaden the band width by the use of a T-matching element such as that described above and numbered 9b and 9c. In applications, in which the distance across the cavity where such a matching element should be located is reduced to the point where the matching element cannot be long enough to offer the proper reactance, a transmission line matching element, such as element 12, may be employed.

It will be obvious to those skilled in the art that there is a wide latitude of choice in the actual details of construction of slot antennas employing the principles covering this invention. There is a wide latitude in the choice of the proportions of the slot and of the various dimensions of the cavity. The physical distortion used to capacitance load the cavity can take a variety of forms, and a wide variety of dielectric materials can be employed to achieve the same end. It is also obvious that flanges or other suitable mechanical supporting means might be added to slot antennas, preferably at their open ends, adapting them to flush mounting on the skin of aircraft. Likewise cover means can be used to keep out foreign matter such as water, ice and dirt. Fibre glass has been found to be a suitable material for this purpose and does not interfere objectionably with the radiation patern.

It will be seen that the slot antenna herein described will provide a flush form of installation contributing no drag whatsoever in aircraft; that it can be constructed in very compact dimensions; that it can be made to be a broad band device; and that it has suitable directional characteristics, in particular, directivity away from the aircraft and/or toward the ground.

It will be apparent that there may be deviations from the invention as described which still fall fairly within the spirit and scope of the invention. Accordingly we claim all such deviations which fall fairly within the spirit and scope of the invention as identified in the hereinafter appended claims.

What is claimed is:

1. A slot antenna including a cavity, said cavity having substantially rectangular cross-sections, a pair of opposite sides of said cavity being distorted so that the corresponding cross-section is not of exact rectangular shape and so that said pair of opposite sides are brought closer together near their centers, said cavity having conductive inner surfaces and one side which does not have a conductive inner surface, an exciter probe mounted so as to protrude into the interior of said cavity, said probe being mounted back from said side which does not have a conductive inner surface by a distance of less than one-half of a wavelength plus any integral number of half wavelengths, said wavelength being the one which corresponds to the lowest intended operating frequency, said probe being mounted ahead of the side opposite to said side which does not have a conductive inner surface by a distance of more than one-eighth and less than one-quarter of one of said wavelengths plus any integral number of halves of said wavelengths, means for feeding radio frequency energy to said exciter probe and transmission line stub matching means electrically connected near an end of said exciter probe.

2. A slot antenna including a cavity, said cavity having substantially rectangular cross-sections, a pair of the opposite sides of said cavity being distorted so as to vary the corresponding cross-section from its rectangular shape, and so that said pair of opposite sides are brought closer together near their centers, said cavity having conductive inner surfaces and one side which is open, an exciter probe mounted so as to protrude into the interior of said cavity, said probe being mounted back from said open side by a distance of at least one-eighth of a wavelength plus any integral number of half wavelengths, said wavelength being the one which corresponds to the lowest intended operating frequency, said probe being mounted ahead of the side opposite to said open side by a distance of more than one-eighth and less than one-quarter of one of said wavelengths plus any integral number of halves of said wavelengths, means for feeding radio frequency energy to said exciter probe, and transmission line stub matching means electrically connected near an end of said exciter probe.

3. A slot antenna including a cavity having substantially rectangular cross-sections, conductive inner surfaces and one side which does not have a conductive inner surface, an exciter probe mounted so as to protrude into the interior of said cavity, means for feeding radio frequency energy to said exciter probe, a conductive element inside said cavity, said conductive element being attached at its approximate center to an end of said exciter probe and being arranged at substantially a right angle to the axis of said probe, said conductive element being arranged parallel to said one side and electrically connected to a pair of opposite sides, the electrical length of said conductive element as measured from its connection to said probe to its connections to either of said opposite sides being more than one-quarter and less than one-half of one wavelength corresponding to the lowest intended operating frequency, and having a dielectric sheath-like element surrounding said conductive element.

4. A slot antenna including a cavity having substantially rectangular cross-sections, conductive inner surfaces and one open side, an exciter probe mounted so as to protrude into the interior of said cavity, means for feeding radio frequency energy to said exciter probe, a conductive element attached at its approximate center to an end of said excited probe and being arranged at substantially a right angle to the axis of said probe, said conductive element being arranged parallel to said open side and electrically connected to a pair of opposite sides, the electrical length of said conductive element as measured from its connection to said probe to its connections to either of said opposite sides being more than one-quarter and less than one-half of one wavelength corresponding to the lowest intended operating frequency, and having a dielectric sheath-like element surrounding said conductive element.

5. A slot antenna including a cavity having substantially rectangular cross-sections, conductive inner surfaces and one side which is open, an exciter probe mounted so as to protrude into the interior of said cavity, said probe being mounted back from said open side by a distance of less than one-eighth of a wavelength plus any integral number of half wavelengths, said wavelength being the one which corresponds to the lowest intended operating frequency, said probe being mounted ahead of the side opposite to said open side by a distance of more than one-eighth and less than one-quarter of one of said wavelengths plus any integral number of halves of said wavelengths, a conductive element connected to said probe and to two opposite conductive inner surfaces and means for feeding radio frequency energy to said exciter probe.

6. A slot antenna including a cavity having substantially rectangular cross sections, conductive inner surfaces and one side which does not have a conductive inner surface, an exciter probe mounted so as to protrude into the interior of said cavity, means for feeding radio frequency energy to said probe, a conductive element within the cavity attached at its approximate center to an end of said probe and arranged at substantially a right angle to the axis of said probe, said conductive element being parallel to said one side and having its ends electrically connected to a pair of opposite sides having conductive inner surfaces, the electrical length of said conductive element as measured from its connection to said probe to its connections to either of said opposite sides being more than one-quarter and less than one-half of one wavelength corresponding to the lowest intended operating frequency.

7. A slot antenna including a cavity having substantially rectangular cross-sections, conductive inner surfaces and one open side, an exciter probe mounted so as to protrude into the interior of said cavity, means for feeding radio frequency energy to said probe, a conductive element within the cavity attached at its approximate center to an end of said probe and arranged at substantially a right angle to the axis of said probe, said conductive element being arranged substantially parallel to said open side and having its ends electrically connected to a pair of opposite sides having conducting inner surfaces, the electrical length of said conductive element as measured from its connection to said probe to its connections to either of said sides being more than one-quarter and less than one half of one wavelength corresponding to the lowest intended operating frequency.

8. A slot antenna comprising a cavity having substantially rectangular cross sections, one non-conductive side, the remaining sides being conductive, an exciter probe in the cavity, and a conductive cylindrical bar connected to said probe and to two opposite conductive sides.

9. A slot antenna according to claim 8 in which a portion of the cavity contains an insulating material having a dielectric constant greater than that of air.

10. A slot antenna comprising a hollow rectangular parallelepiped in which five of the sides comprise conductive inner surfaces, an exciter probe mounted within the parallelepiper, and a straight conductive cylindrical bar connected to said probe and to two opposite conductive surfaces.

11. A broad band antenna comprising a cavity with an H-shaped cross-section, one of whose H-shaped faces is non-conductive, the remaining faces comprising conductive surfaces, an exciter probe mounted on one of the conducting surfaces and protruding into said cavity.

12. An antenna according to claim 11 further comprising a conductive element whose midpoint is connected to said probe.

13. An antenna according to claim 12 in which said conductive element is arranged parallel to the non-conductive face.

14. An antenna according to claim 13 in which the extremities of said conductive element are electrically connected to opposite conducting faces of said cavity.

15. A slot antenna including a cavity having substantially rectangular cross-sections, conductive inner surfaces and one side which does not have a conductive inner surface, a pair of opposite sides having conductive inner surfaces being distorted so that they are brought closer together near their centers, an exciter probe mounted so as to protrude into the interior of said cavity, said probe being mounted back from said one side by a distance of less than one-eighth of a wavelength plus any integral number of half wavelengths, said wavelength being the one which corresponds to the lowest intended operating frequency, said probe being mounted ahead of the side opposite to said one side by a distance of more than one-eighth and less than one-quarter of one of said wavelengths plus any integral number of halves of said wavelengths and means for feeding radio frequency energy to said probe.

16. A slot antenna including a cavity having substantially regular cross-sections, conductive inner surfaces and one side which is open, at least a pair of opposite sides having conductive inner surfaces being distorted so that they are brought closer together near their centers, an exciter probe mounted so as to protrude into the interior of said cavity, said probe being mounted back from said open side by a distance of less than one-eighth of a wavelength plus any integral number of half wavelengths, said wavelength being the one which corresponds to the lowest intended operating frequency, said probe being mounted ahead of the side opposite to said open side by a distance of more than one-eighth and less than one-quarter of one of said wavelengths plus any integral number of halves of said wavelengths and means for feeding radio frequency energy to said exciter probe.

17. A slot antenna comprising a cavity having substantially rectangular cross sections, one non-conductive side, the remaining sides being conductive, an exciter probe in the cavity, and a conductive element connected to said probe and to two opposite conductive sides, said conductive element being surrounded by a dielectric sheath.

18. A slot antenna comprising a hollow rectangular parallelepiped in which five of the sides comprise conductive inner surfaces and the sixth side is non-conducting, an exciter probe mounted within the parallelepiped, and a conductive element surrounded by a dielectric sheath, said conductive element being connected to said probe and to two oppositely conductive surfaces.

ARTHUR DORNE.
DAVID LAZARUS.

References Cited in the file of this patent

UNITED STATES PATENTS

| Number | Name | Date |
|---|---|---|
| 2,283,935 | King | May 26, 1942 |
| 2,369,808 | Southworth | Feb. 20, 1945 |
| 2,398,095 | Katzin | Apr. 9, 1946 |
| 2,400,867 | Lindenblad | May 21, 1946 |
| 2,415,094 | Hansen | Feb. 4, 1947 |
| 2,431,124 | Kees et al. | Nov. 18, 1947 |
| 2,433,368 | Johnson et al. | Dec. 30, 1947 |
| 2,444,066 | Rostas | June 29, 1948 |
| 2,458,556 | Bowen | Jan. 11, 1949 |
| 2,460,401 | Southworth | Feb. 1, 1949 |
| 2,573,460 | Lindenblad | Oct. 30, 1951 |